(12) United States Patent
Sachdev

(10) Patent No.: US 9,691,392 B1
(45) Date of Patent: Jun. 27, 2017

(54) SYSTEM AND METHOD FOR IMPROVED AUDIO CONSISTENCY

(71) Applicant: Uniphore Software Systems, Chennai (IN)

(72) Inventor: Umesh Sachdev, Chennai (IN)

(73) Assignee: UNIPHORE SOFTWARE SYSTEMS, Chennai (IN)

(*) Notice: Subject to any disclaimer, the term of this patent is extended or adjusted under 35 U.S.C. 154(b) by 0 days.

(21) Appl. No.: 15/071,258

(22) Filed: Mar. 16, 2016

(30) Foreign Application Priority Data

Dec. 9, 2015 (IN) .......................... 6580/CHE/2015

(51) Int. Cl.
| | |
|---|---|
| *G10L 21/00* | (2013.01) |
| *G10L 17/04* | (2013.01) |
| *G10L 25/93* | (2013.01) |
| *G10L 25/90* | (2013.01) |
| *G10L 21/0208* | (2013.01) |

(52) U.S. Cl.
CPC .......... *G10L 17/04* (2013.01); *G10L 21/0208* (2013.01); *G10L 25/90* (2013.01); *G10L 25/93* (2013.01)

(58) Field of Classification Search
CPC ...... G06F 3/1204; G06F 3/1247; G06F 3/126; G06F 3/1288; G06F 3/1292
USPC ........ 704/232, 247, 246, 270, E17.016, 224; 379/188, 88.02
See application file for complete search history.

(56) References Cited

U.S. PATENT DOCUMENTS 7,386,448 B1 * 6/2008 Poss ........................ G10L 17/24
379/188

* cited by examiner

*Primary Examiner* — Charlotte M Baker
(74) *Attorney, Agent, or Firm* — Harness, Dickey & Pierce, P.L.C.

(57) ABSTRACT

A voice biometrics system adapted to authenticate a user based on speech diagnostics is provided. The system includes a pre-processing module to receive and pre-process an input voice sample. The pre-processing module includes a clipping module to clip the input voice sample based on a clipping threshold and a voice activity detection module to apply a detection model on the input voice sample to determine an audible region and a non-audible region in the input voice sample. The pre-processing module includes a noise reduction module to apply a noise reduction model to remove noise components from the input voice sample. The voice biometrics system includes a feature extraction module to extract features from the pre-processed input voice sample. The voice biometrics system also includes an authentication module to authenticate the user by comparing a plurality of features extracted from the pre-processed input voice sample to a plurality of enrollment features.

12 Claims, 4 Drawing Sheets

SYSTEM AND METHOD FOR IMPROVED AUDIO CONSISTENCY

PRIORITY STATEMENT

The present application hereby claims priority under 35 U.S.C. §119 to Indian patent application number 6580/CHE/2015 filed 9 Dec. 2015, the entire contents of which are hereby incorporated herein by reference.

BACKGROUND

The invention relates generally to voice biometric applications, and more particularly to a system and a method for increasing a quality of audio signals.

Typically, in a voice authentication system, enrolment of a user's voice sample is performed once. Thereafter, every time the user accesses the system, authentication of the user's is performed. Since the enrolment process is typically performed only once, the initial enrolment audio signal is of importance. However, in certain situations, the initial parameters extracted from the user's enrolment voice sample may not be of the desired quality. In such cases, the user's voice sample for the enrolment process is not accepted and as a result, a re-enrolment process is initiated which deceases the quality of the initial user experience.

Further since the enrolment process is performed only at the initial stages even the user is likely to use the system for a long period thereafter, it is likely that the user's voice might change due to several factors. For example, the user's voice sample can fluctuate on several conditions such as biological ageing, a number of environmental conditions like background noise, surrounding ambience, use of different microphones, quality of microphone, etc. These fluctuations in the user's voice sample contribute to errors in the authentication system by increasing the false acceptance and false rejection rates.

Existing systems typically address the above described problem by asking the users to enroll the input voice sample again which is often a difficult and tedious process for the user.

Therefore, a system and method is needed that provides high quality audio signal that can be used seamlessly in voice biometric applications.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

According to some examples of the present disclosure, a voice biometrics system adapted to authenticate a user based on speech diagnostics is provided. The system includes a pre-processing module configured to receive an input voice sample and to pre-process the input voice sample. The pre-processing module includes a clipping module configured to clip the input voice sample based on a clipping threshold. The pre-processing module also includes a voice activity detection module configured to apply a detection model on the input voice sample to determine an audible region and a non-audible region in the input voice sample. Additionally, the pre-processing module includes a noise reduction module configured to apply a noise reduction model to remove noise components from the input voice sample. The voice biometrics system includes a feature extraction module configured to extract features from the pre-processed input voice sample. In addition, the voice biometrics system also include an authentication module configured to authenticate the user by comparing a plurality of features extracted from the pre-processed input voice sample to a plurality of enrolment features.

According to additional examples of the present disclosure a method for pre-processing input voice sample utilized for an enrolment and an authentication process in a voice biometric applications is provided. The method includes clipping the input voice sample based on a clipping threshold. The method also includes amplifying the magnitude of the input voice sample and detecting an audible region and a non-audible region in the input voice sample. Additionally, the method includes suppressing plurality of noise components from the input voice sample. Lastly, the method performing normalizing steps to remove noise components from the input voice sample caused by the input channel and/or device.

DETAILED DESCRIPTION

Figure 1:
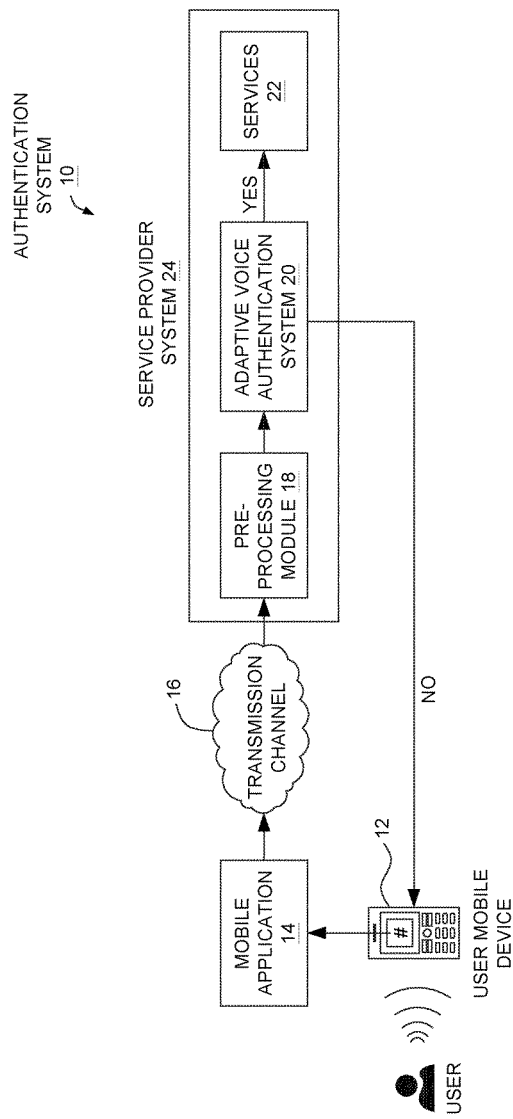
FIG. 1 is a block diagram of an example embodiment of an user authentication system facilitating improved audio consistency over input voice samples implemented according to aspects of the present technique.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Voice biometrics applications are a class of user authentication solutions that utilizes a user's voice to uniquely identify them. To uniquely identify the user, a voice print model is built from the user's voice sample and is used to uniquely identify the user during the authentication process. The system described herein employ several pre-processing techniques on the input voice sample of the user that enables audio consistency and robust normalization resulting in improved enrolment and authentication rates.

FIG. 1 is a block diagram of an example embodiment of an authentication system facilitating improved audio consistency over input voice samples implemented according to aspects of the present technique. The system 10 represents a user's mobile device 12, a mobile application 14, a transmission channel 16, and a service provider system 24. The service provider system 24 includes a pre-processing module 18, an adaptive voice authentication system 20 to authenticate a user for accessing the services 22.

The system 10 depicts the use of an authentication system to analyze a user's unique information for verifying his/her identity. As used herein, the term "user" may refer to natural people using their voice/audio that aids to uniquely identify them. Examples of users include consumers accessing the bank accounts, participating merchants of several organizations, customers transacting credit or debit cards, and the like. In particular, the system 10 is implemented for authorizing a user to obtain access to one or more services provided (as represented by reference numeral 22) by a remote service provider system 24.

The system 10 includes an input means such as a mobile application 14 installed on a user's mobile device 12 for prompting the user to speak a plurality of words. Moreover, the plurality of words spoken by the user are captured and stored by the mobile application 14 as an input voice sample. The mobile application 14 installed on the mobile device 12 operates under the control of a program stored therein and in response to the receipt of the spoken words from the user, transmits the spoken words to the service provider system 22. The input voice sample are transmitted using a transmission channel as represented by reference numeral 16.

The service provider system 24 includes a pre-processing module 18 configured to receive and pre-process the input voice sample. The pre-processed the input voice sample is obtained by filtering a plurality of distortion elements. In particular, the pre-processing module 18 performs several processing operations on the input voice sample and delivers a consistent voice sample and/or audio to the adaptive voice authentication system 20 by normalizing and suppressing the channel and other environmental conditions. The processing operations performed by the pre-processing module 18 are described in further detail below in FIG. 2 and FIG. 3.

The service provider system 24 includes an adaptive voice authentication system 20 to verify the user and correspondingly provide access to the services 22. For example, the services 22 may comprise several banking services and the service provider system 24 may be a bank. For conciseness, the adaptive voice authentication system 20 described herein comprises a user-centric adaptation and audio normalization mechanisms to improve the enrolment and authentication rates for users of the system 10. By using automated user profile adaptation and normalization techniques, the usability of the authentication system is gained.

The functionality of the adaptive voice authentication system 20 is described in detail in India patent application number 6215/CHE/2015 titled "ADAPTIVE VOICE AUTHENTICATION SYSTEM AND METHOD" filed on the Nov. 18, 2015 and is incorporated herein. The manner in which enrolment and authentication rates of the users are dynamically improved using several pre-processing techniques by normalizing and suppressing the channel and other environmental conditions is described in further detail below.

Figure 2:
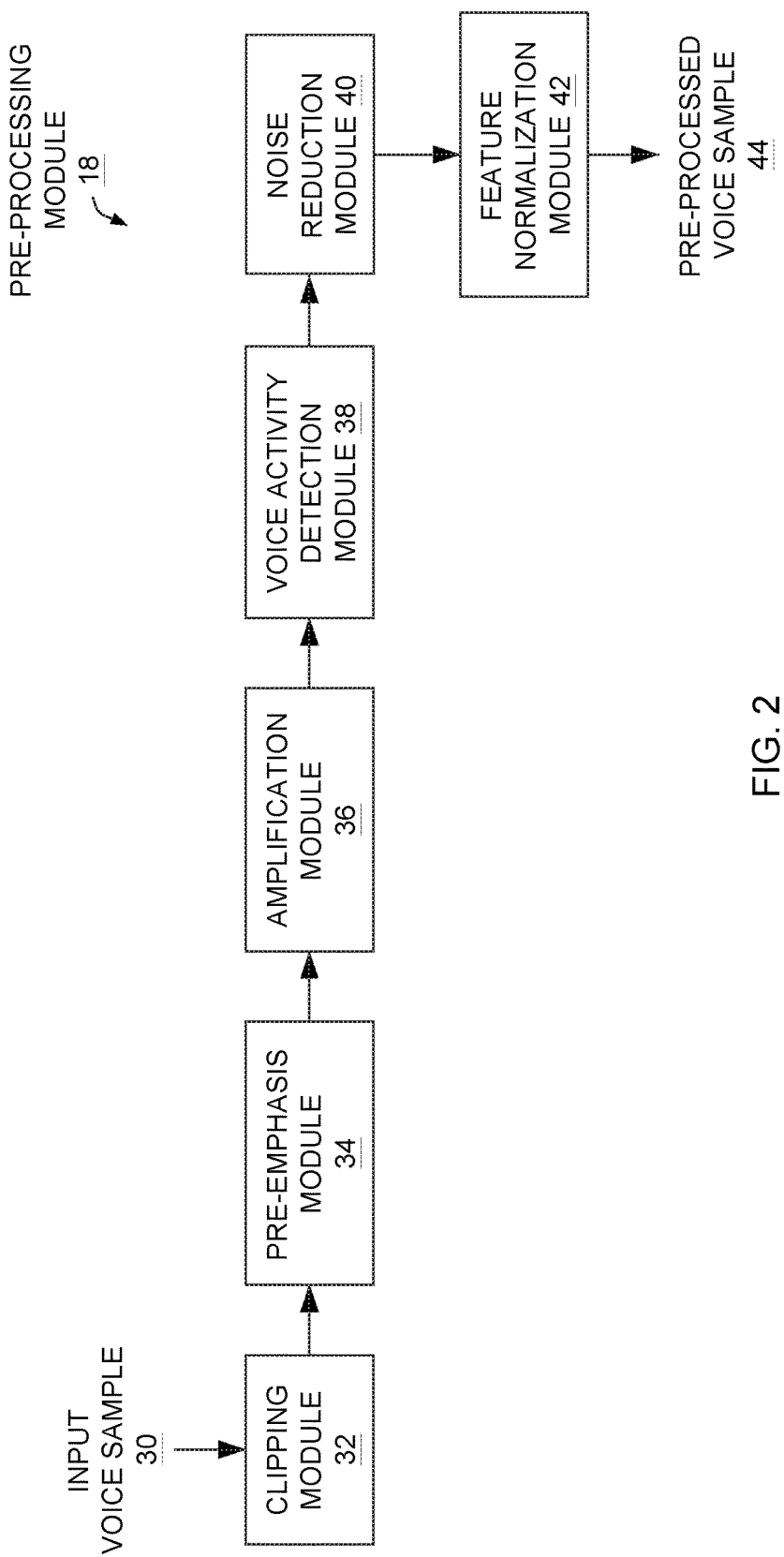
FIG. 2 is a block diagram of an example embodiment of a pre-processing module of the authentication system implemented according to aspects of the present technique.

FIG. 2 is a block diagram of an example embodiment of a pre-processing module of the authentication system implemented according to aspects of the present technique. The pre-processing module 18 includes a clipping module 32, a pre-emphasis module 34, an amplification module 36, a voice activity detection module 38, a noise reduction module 40 and a feature normalization module 42. Each component is described in further detail below.

Voice authentication systems analyze and extract salient features from user's voice for the purpose of authentication. The user's voice samples are the input voice samples (as represented by reference numeral 30) received by the pre-processing module 18. The received input voice samples 30 may be the user's enrolment voice samples or the user's authentication voice samples. In one embodiment, the enrolment technique is implemented when the user uses the system for the first time and is typically done only once. In the course of the enrolment, the user's enrolment voice samples are received by the pre-processing module 18. On the other hand, the received voice samples at the time of authentication are the user's authentication voice samples. In one embodiment, the authentication process is activated every time the user uses the system subsequently to gain access to the system. In the course of the authentication process, the user's authentication voice samples are received by the pre-processing module 18.

Pre-processing module 18 is configured to improve the user's enrolment voice sample and user's authentication voice samples by filtering a plurality of distortion elements. The word 'user's enrolment voice sample and user's authentication voice samples' and user's input voice sample, input voice signal and input voice sample refers to the input voice sample 30 and may be used interchangeably in the description below. In one embodiment, the pre-processing module 18 is configured to employ filtering operations comprising clipping, smoothening, amplifying, detecting speech frames, suppressing noise and feature normalization of the input voice sample 30. As a result of implementation of the pre-processing module 18, the enrolment and authentication rates are improved for all the speakers using variety of microphones under different loudness and noisy conditions.

In one embodiment, the pre-processing module 18 is the core module of the authentication system that ensures consistency of audio and helps in better user experience during enrolment and reduce false rejection rates during authentication. The pre-processing technique is a generic stage that ensures that the input voice samples 30 are obtained in a consistent fashion and is agnostic to channel and other environmental factors. The following paragraphs describe the numerous stages implemented during the pre-processing of the input voice sample 30.

Clipping module 32 is configured to clip the input voice sample 30 based on a clipping threshold. In one example embodiment, when the sequence of continuous input voices samples 30 cross a particular threshold, then it implies that the input voice samples 30 are being clipped. For example, considering the input voice sample 30 utilized in the process of enrolment and authentication, the clipping threshold is set to about 0.95 dB. When the clipped samples are more in the voice input signal 30 then the voice sample is either rejected or else the clipping will be ignored.

Pre-emphasis module 34 is configured to remove low frequency components from the input voice sample 30. In one embodiment, the pre-emphasis module 34 is a smoothened high pass filter. Low frequency signals sampled at high sampling rate tend to yield adjacent samples of similar numerical value. The reason is that low frequency essentially means slow variation in time. So the numerical values of a low frequency signal tend to change slowly or smoothly from sample to sample. By implementing pre-emphasis, the portion of the signal is removed that does not change in relation to its adjacent samples. As a result, only the portion of the input voice sample 30 that varies rapidly is retained.

The rapidly changing signals are the high frequency components of the input voice sample 30. The equation used for smoothening mechanism is represented as 'yt=αx t+(1−a) xt−1', where 'xt' is the time domain sample at time 't' and alpha (α) is the pre-emphasis coefficient which determines the weight given to the current voice sample. In one embodiment, the value of alpha is about 0.97 with respect to voice authentication applications.

Amplification module 36 is configured to amplify the magnitude of the input voice sample 30. In one embodiment, the amplification of the magnitude of the input voice sample 30 involves boosting the signal amplitude such that amplitude of the signal is boosted to desired level. Further, the scaling factor is obtained from ratio of desired level and the maximum amplitude of input voice sample 30. The signal is scaled with determined scaling factor to amplify the signal.

Voice activity detection module 38 is configured to apply a detection model on the input voice sample 30 to determine an audible region and a non-audible region in the input voice sample 30. In one embodiment, voice activity detection, is a technique used in speech processing to detect the presence or absence of human speech in a voice sample. For conciseness, the voice activity detection is used mainly in speech compression and speech recognition. The voice activity detection module 38 is configured to identify audible and non-audible regions in the input voice sample 30 based on features from short term energy, zero crossing rate, pitch to build a statistical model which can detect audible and non-audible regions from the input voice sample 30. The components of voice activity detection module 38 are described further detail below in FIG. 3

Noise reduction module 40 is configured to apply a noise reduction model to remove noise components from the input voice sample 30. In one embodiment, the noise reduction model implements techniques like Spectral Subtraction (SS) based on Minimum Mean Square Error (MMSE) estimation. This estimation based methods are used in de-noising the input voice sample 30. In the MMSE method, the modulation magnitude spectrum of clean speech is estimated from noisy observations. The proposed estimator minimizes the mean-square error between the modulation magnitude spectra of clean and estimated speech. Noise may be defined as any unwanted signal that interferes with the communication, measurement or processing of an information-bearing signal such as an enrolment voice sample or an authentication voice sample. Noise can cause transmission errors and may even disrupt a communication process; hence noise processing is an important part of signal pre-processing.

In further embodiment, the spectral subtraction method is a simple and effective method of noise reduction. In this method, a signal spectrum estimated of frames of recorded sample and averaged noise spectrum are subtracted from each other to get the noise free desired signal. The phase is same in the input and restored or desired signal. A minimum mean square error (MMSE) estimator is used which is an estimation method which minimizes the mean square error (MSE) of the fitted values of a dependent variable, which is a common measure of estimator quality.

In one example embodiment, the input signal y(m) may be represented as a sum of the speech signal x(m) and the noise n(m). The equation is represented as y(m)=x(m)+n(m). In the frequency domain, this may be denoted as: $Y(j\omega)=X(j\omega)+N(j\omega)=>X(j\omega)=Y(j\omega)-N(j\omega)$, where $Y(j\omega)$, $X(j\omega)$, $N(j\omega)$ are Fourier transforms of y(m), x(m), n(m), respectively.

Feature normalization module 42 is configured to apply a mean and variance normalization model to remove noise components from the input voice sample 30 caused by the input channel and/or device. In one embodiment, Cepstal Mean Normalization (CMN) and Cepstral Variance Normalization (CVN) are simple ways of performing feature normalization. In one example embodiment, for a given a segment of acoustic feature vectors $O(T)=\{o1, o2, \ldots, oT\}$, the mean and variance of the vectors are computed over a specified time segment. Then each vector is recomputed by subtracting it from the mean and dividing the variance. This approach normalizes the vectors and reduces the distortion caused by the channel. Longer segments yield better mean and variance estimates, but introduces longer delay since the system needs to wait till the end of the segment before normalization can be done. To balance the delay and accuracy, about a 400 milli second window is chosen to implement the CMN and CVN. Moreover, only diagonal covariance is considered while implementing CVN since the features are assumed uncorrelated. After performing the pre-processing steps like clipping, smoothening, amplifying, detecting speech frames, suppressing noise and feature normalization on the input voice sample 30, the output voice sample is an improved voice sample and is represented as pre-processed voice sample 44.

Post-processing module (not shown) is configured to apply a Gaussian mixture model to detect the input channel and/or device through which the features from the voice samples are entered. In one embodiment, it is observed that variability in the handset or a user's device causes significant performance degradation in speaker recognition systems. Channel compensation in the front-end processing addresses linear channel effects, but there is evidence that handset transducer effects are nonlinear in nature and are thus difficult to remove from the features prior to training and recognition. Since, the handset effects remain in the features, the speaker's model will represent the speaker's acoustic characteristics coupled with the distortions caused by the handset from which the training speech is collected. The effect is that log-likelihood ratio scores produced from different speaker models can have handset-dependent biases and scales. To offset this, score normalization is done in addition to pre-processing. This is done as a post processing step after pre-processing the input voice sample 30.

In one example embodiment, to identify the handset type (mobile, landline, desktop), a set of training labels is created. A Gaussian Mixture Model (GMM) based classifier is built. A set of 50 speakers are asked to speak the same utterance through three sets of microphones and a 256 mixture GMM is built for each set of microphone. After the voice biometric engine outputs a score, the input voice sample 30 is passed through the score normalizer module. This module detects the handset type using the GMM classifier and normalizes the score accordingly. Each handset type is normalized differently to generate the final score.

Further to the pre-processing of the input voice sample 30, the pre-processed voice sample 44 is received by the feature extraction module (not shown). The feature extraction module is configured to extract features from the pre-processed voice sample 44. Thereafter, an authentication module is configured to authenticate the user by comparing a plurality of features extracted from the pre-processed voice sample 44 to a plurality of enrolment features. The enrolment features are the features enrolled and stored at the time of enrollment process.

The manner in which the voice activity detection module 38 of the pre-processing module 18 implements speech processing and/or speech detection in the input voice sample 30 is described in further detail below.

Figure 3:
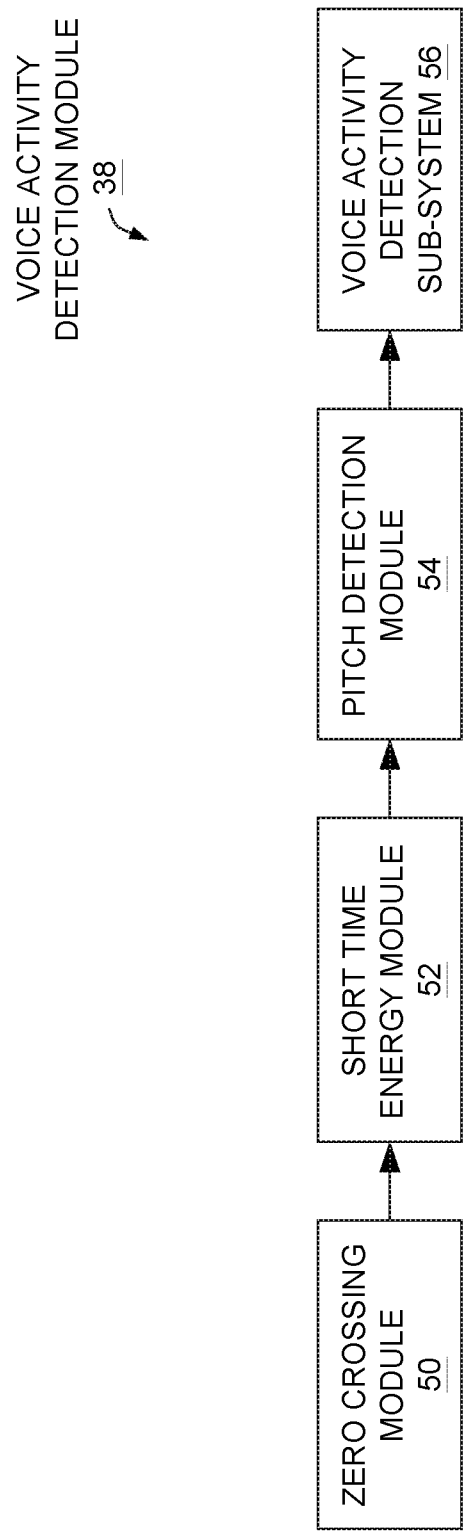
FIG. 3 is a block diagram of an example embodiment of a voice activity detection module of the pre-processing module implemented according to aspects of the present technique.

FIG. 3 is a block diagram of an example embodiment of a voice activity detection module of the pre-processing module implemented according to aspects of the present technique. The voice activity detection module 38 includes a zero crossing module 50, a short time energy module 52, a pitch detection module 54, and a voice activity detection sub-system 56. Each component is described in further detail below.

Zero crossing module 50 is configured to detect the polarity of the input voice sample 30 across a time. In one embodiment, zero crossing rates are used for voice activity detection (VAD), i.e., finding whether a segment of speech is voiced or unvoiced. The zero-crossing rate is the rate of sign-changes along the input voice sample 30, i.e., the rate at which the signal changes from positive to negative or back. Zero crossing rate indicates the presence or absence of speech in the input signal. When the zero crossing rate is high, the frame is considered to be unvoiced frame and when the zero crossing rate is low, the frame is considered to be voiced frame. Thus the voiced frame is the audible region of the input voice sample 30 and the unvoiced frame is the non-audible region of the input voice sample 30.

Short time energy module 52 is configured to classify the audible region and the non-audible region of the input voice sample 30. In one embodiment, short-time energy calculation is another parameter used in the classification of audible region and the non-audible region of the input voice sample 30. When the energy of the incoming frame of the input voice sample 30 is high, the frame is classified into voiced frame i.e the audible region and when the energy of the incoming frame of the input voice sample 30 is low, it is classified into unvoiced frame i.e the non-audible region of the input voice sample 30. In one example embodiment, within the frame by frame block, the speech signal is divided into non-overlapping frames of about 160 samples at about 8 KHz sampling frequency which is equivalent to about 20 ms time duration. From this 160 samples, the root mean square energy is calculated as sum of squares of all the samples. This is then averaged and square root of the average is the Root Mean Square for that frame.

Pitch detection module 54 is configured to estimate a pitch level of the input voice sample 30. In one embodiment, the pitch detection algorithm (PDA) is an algorithm designed to estimate the pitch or fundamental frequency of a virtually periodic signal, usually a digital recording of a speech or a musical note, tone or the input voice sample 30. This can be done in the time domain or the frequency domain or both the two domains.

In one example embodiment, in the time domain, a pitch detection algorithm typically estimates the period of a quasiperiodic signal, then inverts that value to give the frequency. One simple approach would be to measure the distance between zero crossing points of the signal (i.e. the zero-crossing rate). In other example embodiment, in the frequency domain, polyphonic detection is possible, usually utilizing the period gram to convert the signal to an estimate of the frequency spectrum. This requires more processing power as the desired accuracy increases, although the well-known efficiency of the FFT, makes it suitably efficient for many purposes.

Voice activity detection sub-system 56 is configured to detect plurality of speech frames comprising speech and non-speech frames of the input voice sample 30. The features mentioned above, are then used as inputs to build Gaussian Mixture Model (GMM) based classifiers. In one example embodiment, two GMM's are trained using the training data. Training data is obtained by manually tagging the silence and speech frames from several speech files. This training data is then used to build two GMM's, one for speech frame and one for non-speech frames (i.e silence and noise). Since, the speech data is more, 256 mixture model is built for speech GMM and for non-speech 64 mixture model is built. At runtime, each input frame is scored against the two GMM's which outputs a log-likelihood score. Then based on some heuristics for smoothening, the frame is chosen as either being speech or silence.

The flow of the pre-processing steps to provide the audio consistency in the input voice sample is described in detail below. A method for pre-processing input voice sample utilized for an enrolment and an authentication process in a voice biometric applications includes clipping the input voice sample based on a clipping threshold. The method further includes amplifying the magnitude of the input voice sample and detecting an audible region and a non-audible region in the input voice sample. The method includes suppressing plurality of noise components from the input voice sample and performing normalizing steps to remove noise components from the input voice sample caused by the input channel and/or device.

The benefits of a preprocessing module 18 was analyzed on the experimental results. The process described in FIG. 2 of the present invention will be described below in further detail with examples thereof, but it should be noted that the present invention is by no means intended to be limited to these examples.

In one example embodiment, a set of 100 users were asked to enroll the input voice sample in a variety of environments like noisy conditions, using low quality microphones, speaking loudly and softly. The test audio samples were collected from users using an android application and a web application. In one embodiment, this android application was designed for collecting the voice samples and details of various users and devices. For example, in one embodiment, the user needs to record the phrase "My voice is my password" and android application uploads the voice samples to the storage module. After uploading the voice sample, the user is asked to provide the next voice sample. After providing three voice samples, the user will get a user id and a confirmation that the voice samples have been successfully uploaded to the system. In another embodiment, the web application is designed for the collecting voice samples from different users and from various laptops. The user needs to provide his/her details like his name, email, device details, gender, age in the form almost similar to the android application The enrolment rates of the user were observed with and without implementation of preprocessing module 18. It was observed, by using noise suppression, clipping check and amplitude correction, the enrolment performance was improved to about 18 percent absolute.

In one embodiment, the implementation of the pre-processing module 18 also improves the authentication rates. This audio consistency also helps during the verification stage when there is a mismatch between the enrolled and verification conditions either due to noise or microphone changes. For this experiment, all the users who enrolled using Android application were asked to verify using a web portal or a different phone. And similarly, those users who enrolled using the web portal were asked to verify using a cell phone. This way for all the 100 users, there was a mismatch in the enrollment and verification conditions.

It was observed, the implementation of preprocessing module 18 gives an absolute increase of about 5 percent in authentication success rate when the conditions are mismatched. By performing channel normalization and other techniques in preprocessing, a consistent audio is then provided to the adaptive authentication module which improves the authentication rate. It may be noted that pre-processing module 18 is independent of the authentication module. Hence, the pre-processing module 18 can be used with other systems too if needed.

Thus the implementation of the preprocessing module 18 in the authentication system ensures that a consistent speech signal is provided to the core engine which helps in increase in enrolment and also improves the verification success rate. Preprocessing for noise and channel conditions also ensures that the user does not have to enroll every time there is a change in surrounding environment (clean to noisy conditions) or a change in microphone (could be due to a change in cell phone from the user's side). Being agnostic to the core engine enables this to be a plug and play for other voice biometric engines too.

Figure 4:
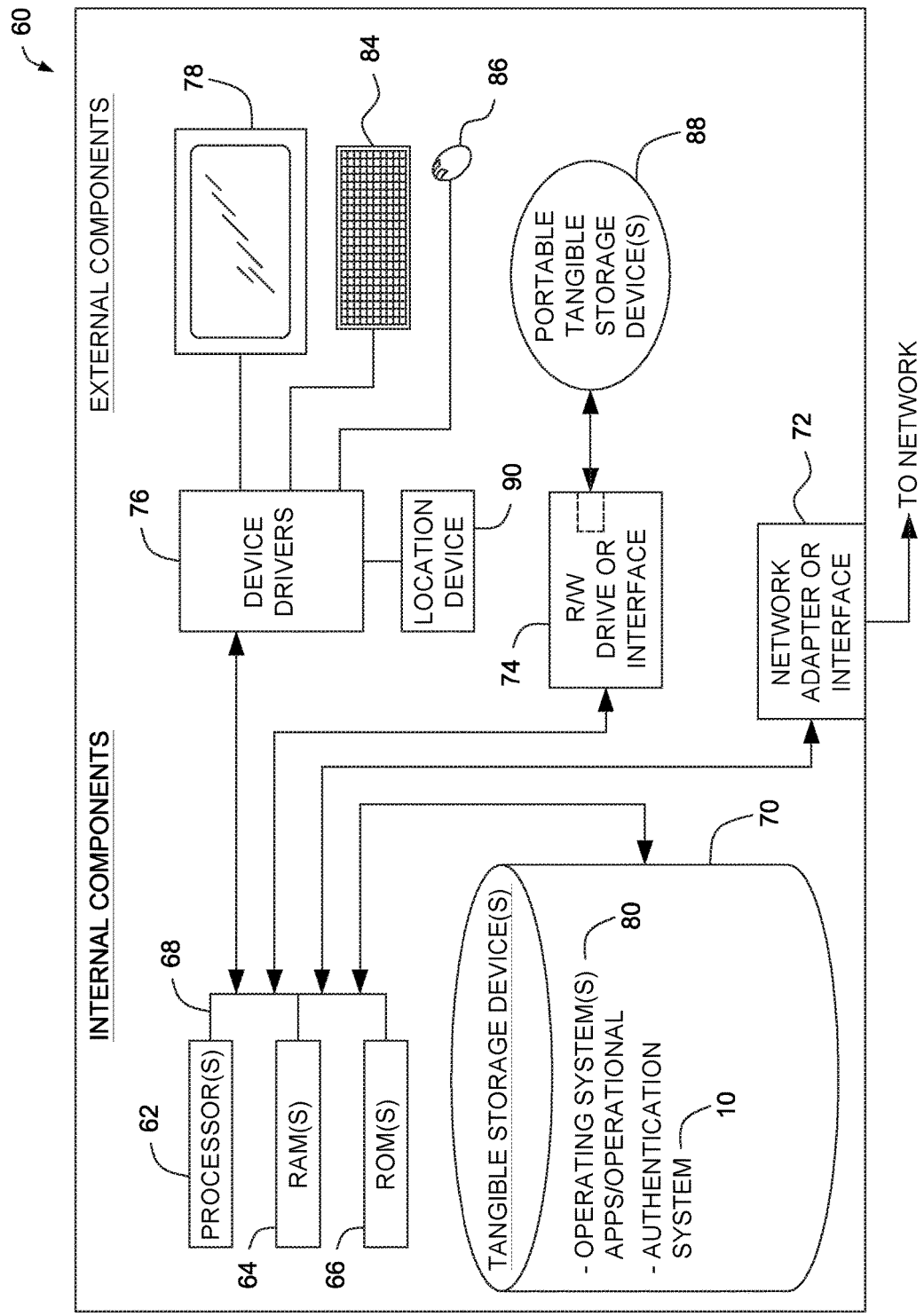
FIG. 4 is a block diagram of an embodiment of a computing device executing modules of a voice biometrics system, in accordance with an embodiment of the present invention.

FIG. 4 is a block diagram of an embodiment of a computing device executing modules of an authentication system, in accordance with an embodiment of the present invention. The modules of the authentication system described herein are implemented in computing devices. One example of a computing device 60 is described below in FIG. 4. The computing device comprises one or more processor 62, one or more computer-readable RAMs 64 and one or more computer-readable ROMs 66 on one or more buses 68. Further, computing device 60 includes a tangible storage device 70 that may be used to execute operating systems 80, a preprocessing module 18 and adaptive voice authentication system 20.

The various modules of the authentication system 10 including a pre-processing module 18 and the adaptive voice authentication system 20 can be stored in tangible storage device 70. Both, the operating system and the authentication system 10 are executed by processor 62 via one or more respective RAMs 64 (which typically include cache memory).

Examples of storage devices 70 include semiconductor storage devices such as ROM 66, EPROM, flash memory or any other computer-readable tangible storage device that can store a computer program and digital information.

Computing device also includes a R/W drive or interface 74 to read from and write to one or more portable computer-readable tangible storage devices 88 such as a CD-ROM, DVD, memory stick or semiconductor storage device. Further, network adapters or interfaces 72 such as a TCP/IP adapter cards, wireless wi-fi interface cards, or 3G or 4G wireless interface cards or other wired or wireless communication links are also included in computing device.

In one embodiment, the authentication system 10 can be downloaded from an external computer via a network (for example, the Internet, a local area network or other, wide area network) and network adapter or interface 72. Computing device further includes device drivers 76 to interface with input and output devices. The input and output devices can include a computer display monitor 78, a keyboard 84, a keypad, a touch screen, a computer mouse86, and/or some other suitable input device.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A voice biometrics system adapted to authenticate a user based on speech diagnostics, the voice biometrics system comprising:
    a pre-processing module configured to receive an input voice sample and pre-process the input voice sample by:
        a clipping module configured to clip the input voice sample based on a clipping threshold;
        a voice activity detection module configured to apply a detection model on the input voice sample to determine an audible region and a non-audible region in the input voice sample; and
        a noise reduction module configured to apply a noise reduction model to remove noise components from the input voice sample;
    a feature extraction module configured to extract features from the pre-processed input voice sample; and
    an authentication model configured to authenticate the user by comparing a plurality of features extracted from the pre-processed input voice sample to a plurality of enrolment features, wherein the voice activity detection module further comprises a zero crossing module configured to detect the polarity of the input voice sample across a time.

2. The voice biometrics system of claim 1, wherein the pre-processing module further comprises:
    a pre-emphasis module configured to remove the low frequency components from the input voice sample; and
    an amplification module configured to amplify the magnitude of the input voice sample.

3. The voice biometrics system of claim 1, further comprising a post-processing module configured to apply a gaussian mixture model to detect the input channel and/or device through which the features from the voice samples are entered.

4. The voice biometrics system of claim 1, wherein the voice activity detection module further comprises a short time energy module configured to classify the audible region and the non-audible region of the input voice sample.

5. The voice biometrics system of claim 1, wherein the voice activity detection module further comprises a pitch detection module configured to estimate a pitch level of the input voice sample.

6. The voice biometrics system of claim 1, wherein the voice activity detection module further comprises voice activity detection sub-system configured to detect plurality of speech frames comprising speech and non-speech frames of the input voice sample.

7. The voice biometrics system of claim 1, wherein the pre-processing module further comprises a feature normalization module configured to apply a mean and variance normalization model to remove noise components from the input voice sample caused by the input channel and/or device.

8. A voice biometrics system adapted to authenticate a user based on speech diagnostics, the voice biometrics system comprising:
    a pre-processing module configured to receive an input voice sample and pre-process the input voice sample by:
        a clipping module configured to clip the input voice sample based on a clipping threshold;
        a voice activity detection module configured to apply a detection model on the input voice sample to determine an audible region and a non-audible region in the input voice sample; and
        a noise reduction module configured to apply a noise reduction model to remove noise components from the input voice sample;
    a feature extraction module configured to extract features from the pre-processed input voice sample; and
    an authentication model configured to authenticate the user by comparing a plurality of features extracted from the pre-processed input voice sample to a plurality of enrolment features, further comprising a post-processing module configured to apply a gaussian mixture model to detect the input channel and/or device through which the features from the voice samples are entered.

9. A voice biometrics system adapted to authenticate a user based on speech diagnostics, the voice biometrics system comprising:
    a pre-processing module configured to receive an input voice sample and pre-process the input voice sample by:
        a clipping module configured to clip the input voice sample based on a clipping threshold;
        a voice activity detection module configured to apply a detection model on the input voice sample to determine an audible region and a non-audible region in the input voice sample; and
        a noise reduction module configured to apply a noise reduction model to remove noise components from the input voice sample;
    a feature extraction module configured to extract features from the pre-processed input voice sample; and
    an authentication model configured to authenticate the user by comparing a plurality of features extracted from the pre-processed input voice sample to a plurality of enrolment features, wherein the voice activity detection module further comprises a pitch detection module configured to estimate a pitch level of the input voice sample.

10. A voice biometrics system adapted to authenticate a user based on speech diagnostics, the voice biometrics system comprising:
  a pre-processing module configured to receive an input voice sample and pre-process the input voice sample by:
    a clipping module configured to clip the input voice sample based on a clipping threshold;
    a voice activity detection module configured to apply a detection model on the input voice sample to determine an audible region and a non-audible region in the input voice sample; and
    a noise reduction module configured to apply a noise reduction model to remove noise components from the input voice sample;
  a feature extraction module configured to extract features from the pre-processed input voice sample; and
  an authentication model configured to authenticate the user by comparing a plurality of features extracted from the pre-processed input voice sample to a plurality of enrolment features, wherein the voice activity detection module further comprises voice activity detection subsystem configured to detect plurality of speech frames comprising speech and non-speech frames of the input voice sample.

11. A voice biometrics system adapted to authenticate a user based on speech diagnostics, the voice biometrics system comprising:
  a pre-processing module configured to receive an input voice sample and pre-process the input voice sample by:
    a clipping module configured to clip the input voice sample based on a clipping threshold;
    a voice activity detection module configured to apply a detection model on the input voice sample to determine an audible region and a non-audible region in the input voice sample; and
    a noise reduction module configured to apply a noise reduction model to remove noise components from the input voice sample;
  a feature extraction module configured to extract features from the pre-processed input voice sample; and
  an authentication model configured to authenticate the user by comparing a plurality of features extracted from the pre-processed input voice sample to a plurality of enrolment features, wherein the pre-processing module further comprises a feature normalization module configured to apply a mean and variance normalization model to remove noise components from the input voice sample caused by the input channel and/or device.

12. A voice biometrics system adapted to authenticate a user based on speech diagnostics, the voice biometrics system comprising:
  a pre-processing module configured to receive an input voice sample and pre-process the input voice sample by:
    a clipping module configured to clip the input voice sample based on a clipping threshold;
    a voice activity detection module configured to apply a detection model on the input voice sample to determine an audible region and a non-audible region in the input voice sample; and
    a noise reduction module configured to apply a noise reduction model to remove noise components from the input voice sample;
  a feature extraction module configured to extract features from the pre-processed input voice sample; and
  an authentication model configured to authenticate the user by comparing a plurality of features extracted from the pre-processed input voice sample to a plurality of enrolment features, wherein the voice activity detection module further comprises a short time energy module configured to classify the audible region and the non-audible region of the input voice sample.

* * * * *